March 29, 1932. L. T. THURBER 1,851,221
APPARATUS FOR SUPPLYING FUEL TO INTERNAL COMBUSTION ENGINES, ETC
Original Filed Oct. 3, 1923   3 Sheets-Sheet 1
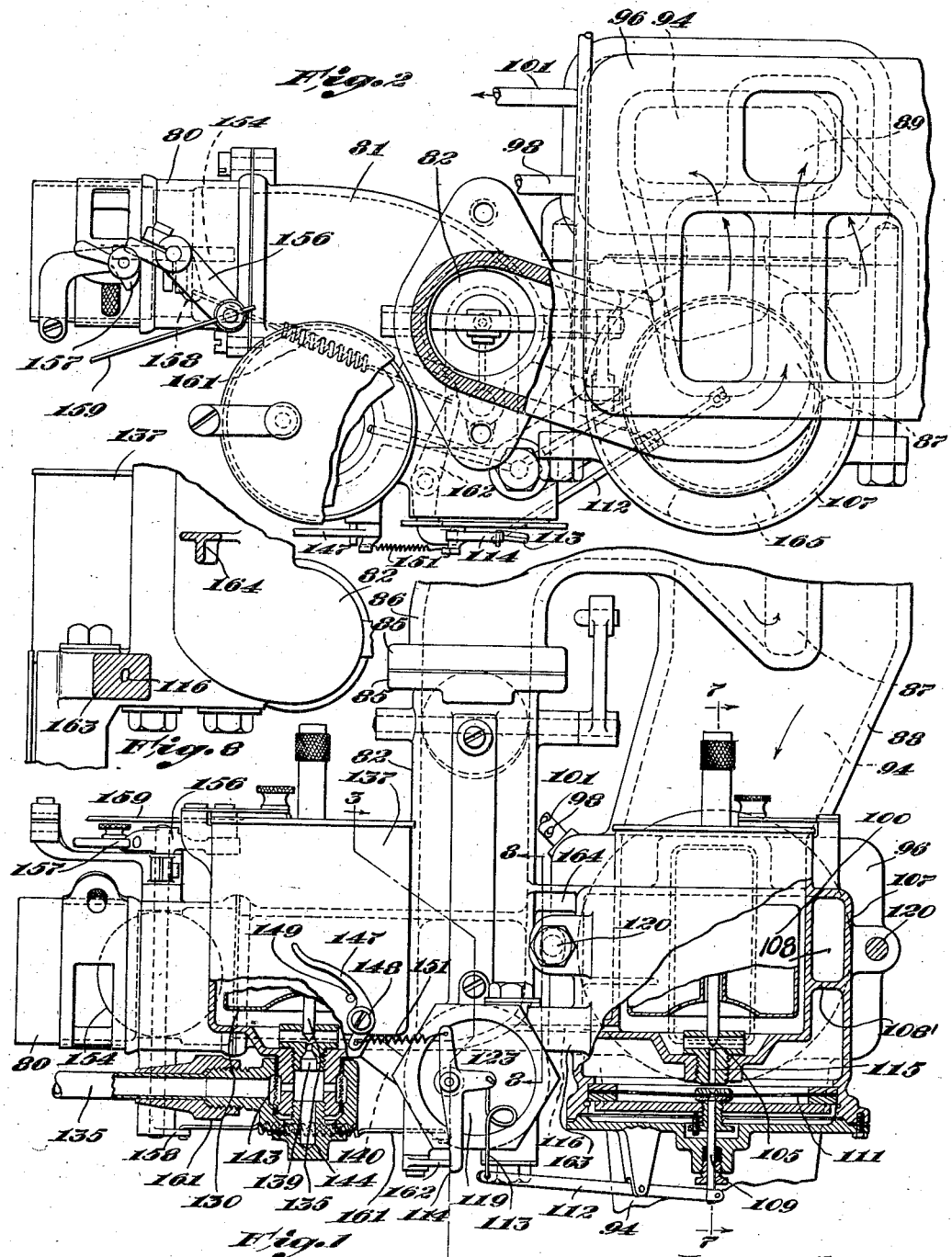

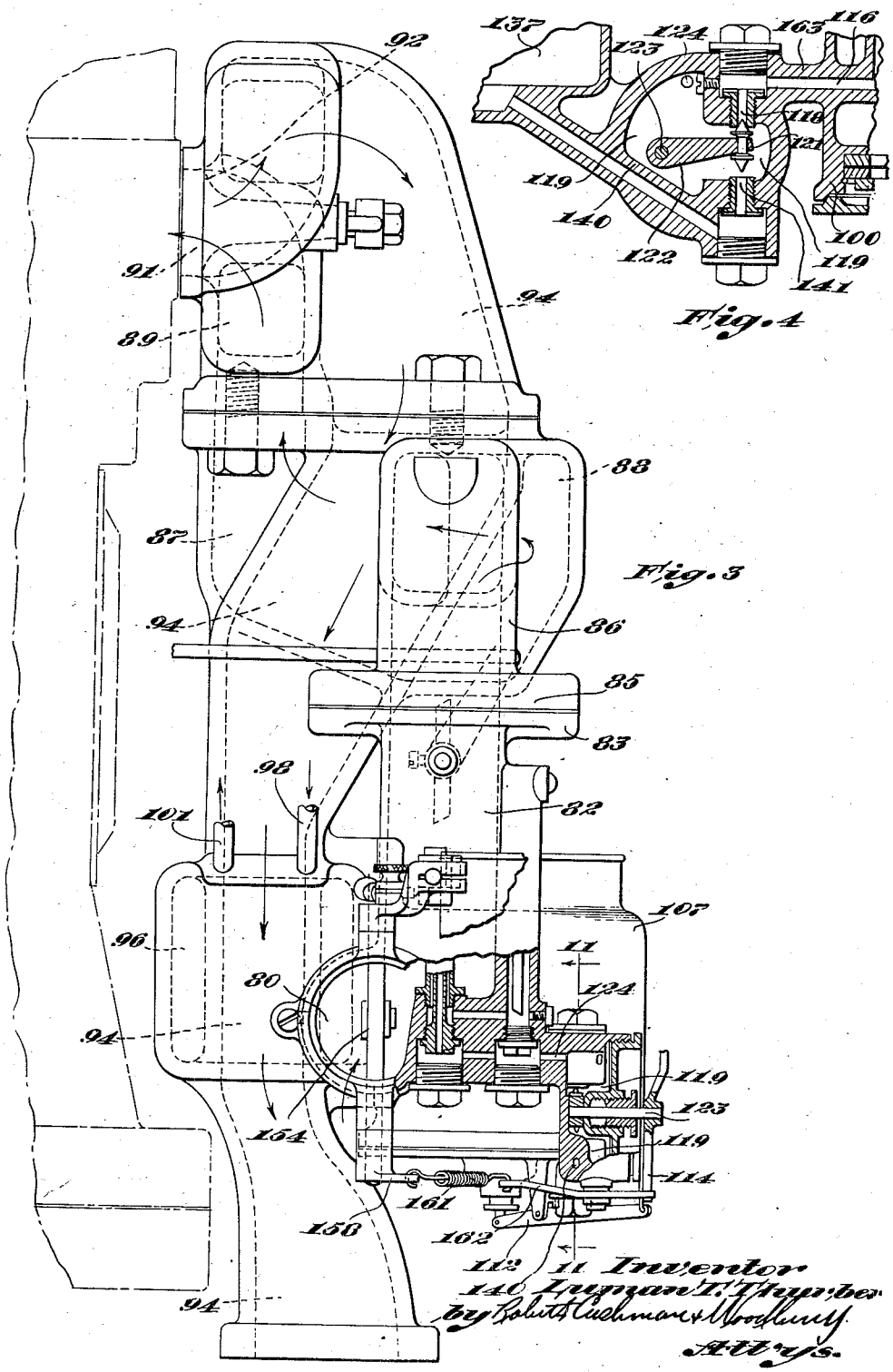

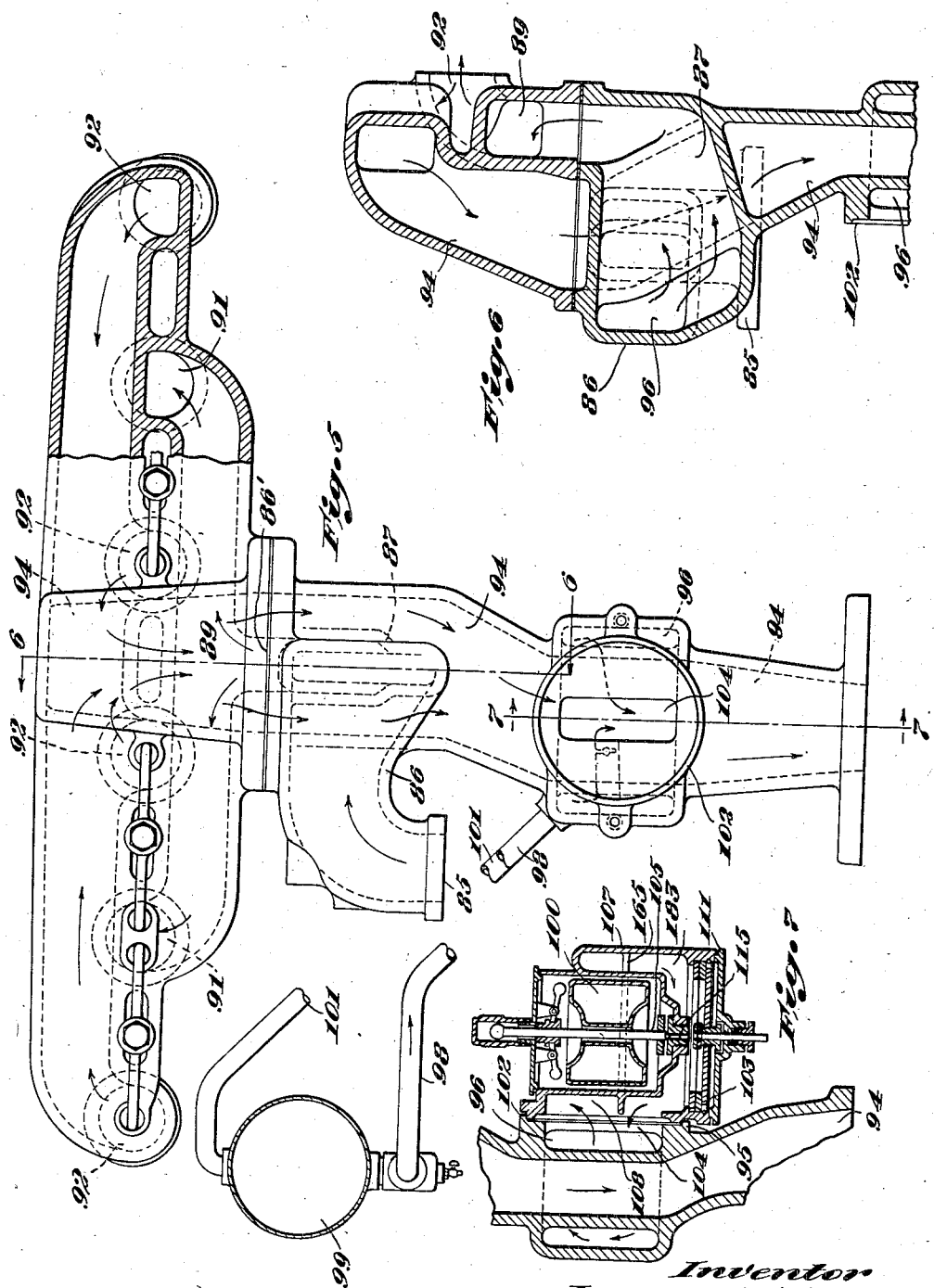

Patented Mar. 29, 1932

1,851,221

UNITED STATES PATENT OFFICE

LUMAN T. THURBER, OF BROOKLINE, MASSACHUSETTS, ASSIGNOR TO THE THURBER-ATOR CORPORATION, OF ROCKLAND, MAINE, A CORPORATION OF MAINE

APPARATUS FOR SUPPLYING FUEL TO INTERNAL COMBUSTION ENGINES, ETC.

Original application filed October 6, 1923, Serial No. 667,062. Divided and this application filed December 14, 1928. Serial No. 325,958.

Objects of the present invention are to provide apparatus for supplying fuel to internal combustion engines which permits the use of heavy fuel, which conditions the fuel for efficient combustion, which avoids carbon deposit in the engine, which is economical in construction and easy to install and repair, and which is generally superior to apparatus heretofore proposed for the purpose. This application is a division of my application, Serial No. 667,062, filed October 6, 1923, which has since matured into Patent No. 1,776,871 dated September 30, 1930.

For the purpose of illustrating the genus of the invention a concrete embodiment is shown in the accompanying drawings in which:—

Fig. 1 is a side elevation, parts being broken away to show the feeding and control mechanism for both light and heavy fuel;

Fig. 2 is a plan view of the same, parts being broken away;

Fig. 3 is an end elevation, parts being sectional on the line 3—3 of Fig. 1;

Fig. 4 is a detail section of the regulatory valve connecting the gasoline and kerosene float-chambers with the mixing chamber;

Fig. 5 is a side elevation of the manifold with the carbureter and other mechanism removed;

Fig. 6 is a section on the line 6—6 of Fig. 5;

Fig. 7 is a detail section of the kerosene float-chamber on the line 7—7 of Fig. 1; and Fig. 8 is a detail section on the line 8—8 of Fig 1.

In the embodiment shown in the drawings the engine manifold (Figs. 2, 3 and 5) is provided with exhaust ports 92 and intake ports 91 and connected to the manifold at 86' is a casting comprising the vertical portion 94 through which the exhaust gases pass downwardly and a lateral branch 86 through which the fuel mixture flows to the intake ports 91 through the passageways 87 and 89 (Figs. 5 and 6). Surrounding the vertical portion 94 is an integral jacket forming an annular fuel heating chamber 96. Fuel is supplied to this chamber through pipe 98 and the chamber is vented through pipe 101 (Figs. 1, 2, 3 and 5). This heating chamber is provided with an opening 104 on the outer side (Figs. 5 and 7) and the carbureter casting is mounted over this opening at the joint 102 (Fig. 7), the joint preferably being of the conical type as illustrated. The carbureter casting comprises a kerosene float-chamber 107, gasoline float chamber 137 and a mixing chamber 82. All of these chambers are cast integrally together, the chambers 82 and 107 being integrally connected at 164 and 163 (Figs. 1 and 8). The upper end 83 of the mixing chamber 82 is connected to the end 85 of the aforesaid portion 86 (Fig. 3). Air is introduced into the mixing chamber through the air intake 80 (Figs. 1, 2 and 3) and the lower portion 81 (Fig. 2) of the carbureter casting.

The kerosene float-chamber 107 is provided with a double wall thus forming a jacket chamber 108 which communicates with the heating chamber 96 through the opening 104 (Figs. 5 and 7). Extending horizontally across the chamber 108 is a rib 108' which divides the chamber into upper and lower parts, the two parts communicating through opening 165 (Figs. 2 and 7) and through the heating chamber. Thus the fuel circulates through the heating chamber and through the jacket of the float-chamber in the direction indicated by the arrows in Fig. 7, thereby heating the float-chamber and maintaining a considerable supply of heated fuel at all times. Fuel flows from the jacket chamber 108 into the float-chamber through passageway 115 (Fig. 7) controlled by needle valve 105 which in turn is controlled by the float 100. Heated kerosene flows from the float-chamber to the mixing chamber through a duct 116 (Figs. 1, 4 and 8) thence through valve chamber 119 and thence through duct 124 (Figs. 3 and 4).

Gasoline flows from the float-chamber 137 through the duct 140 (Figs 1 and 4) to the valve chamber 119 and thence through duct 124 to the mixing chamber. A valve 121 mounted on arm 122 (Fig. 4) which is pivoted at 123 controls the kerosene and gasoline outlets 118 and 141 to the valve chamber 119, the kerosene being shut off when the valve is rotated in a counter-clockwise direction to the position shown in Fig. 4 and the gasoline being shut off when the valve is rotated in a clockwise direction. The valve shaft 123 is controlled by the three-arm member 114 (Fig. 1) on the outside of the valve chamber. The upper arm is connected through spring 151 to lever 147 pivoted at 148 and normally resting against a stop 149. The lower arm of member 114 is connected with the choke control through arm 162, spring 161 and arm 158 mounted on the lower end of the choke valve shaft, this valve being controlled in the usual way through arm 156 and a connection 159 leading to the instrument board (Figs. 1 and 2). A cam lever 157 may also be associated with the choke to adjust the valve. The horizontal arm of member 114 (Fig. 1) is connected through the spring 113 to the lever 112 which is connected at its opposite end through pin 109 to a thermostatic disk 111. This disk, which is preferably of the concave-convex bimetallic type disclosed in the platent to Spencer No. 1,448,240, is mounted in the lower portion of the jacket chamber 108 so that it is immersed in the heated fuel, openings through the disk being provided as shown in Fig. 1 to permit the fuel to flow therethrough and equalize the pressure on opposite sides of the disk. The thermostatic disk is so constructed that it normally cups downwardly in the middle and when heated to a predetermined temperature suddenly snaps upwardly to a position wherein it is cupped upwardly in the middle. Thus in the normal position of the thermostat shown in Fig. 1 the valve 121 is held in the position shown in Fig. 4 wherein gasoline is admitted to the mixing chamber and the kerosene is shut off. However, after the engine is started and the kerosene in the float-chamber becomes heated to the desired temperature the thermostatic disk 111 snaps upwardly thereby shifting the valve to its lower position (Fig. 4) whereupon the gasoline is shut off and heated kerosene is admitted to the mixing chamber. The springs 113, 151 and 161 acting on the three arms of the member 114 are so tensioned that actuation of either lever 147 or the choke will swing the valve to the gasoline position independently of the position of the thermostat.

Owing to the continuous circulation of heated fuel around the kerosene float-chamber, the reservoir of kerosene within the float-chamber is maintained in proper condition for delivery to the mixing chamber. Owing to the close juxtaposition and direct connection between the exhaust casting 94 and the carbureter casting, the latter heats up quicker and is more easily maintained in heated condition. The thermostat is immersed in the heated fuel and is therefore quickly responsive to change in the temperature of the fuel. All of the conduits for the heated fuel are inside the associated castings so that substantially no chilling takes place as in apparatus where the heated fuel is conducted through exposed pipes.

I claim:

1. Fuel supply apparatus comprising a conduit including a float chamber, means for heating the fuel while it is in the float chamber, a valve for controlling the flow of fuel from the float chamber, this valve being operable between full open and closed positions, and means responsive to the temperature of fuel in the float chamber for operating the valve between full open and closed positions for controlling the flow of fuel therefrom.

2. Fuel supply apparatus comprising a fuel conduit including a float-chamber, means for heating the fuel before it leaves said float-chamber, and a thermostat in heat-contacting relationship to said float-chamber for interrupting the flow of fuel from the chamber when the temperature of the fuel decreases below a predetermined point.

3. Apparatus for supplying fuel to a device comprising a fuel reservoir, a conduit connecting said reservoir with said device, a float-chamber in said conduit, means for heating the fuel while it is in the float-chamber, and means responsve to the temperature of the fuel at a point between the inlet to the float-chamber and said device for controlling the flow of fuel from the float-chamber to the device.

4. Apparatus for supplying heated fuel to a device comprising a fuel reservoir, a float-chamber, a jacket for said chamber, a circuitous conduit including the space between said chamber and said jacket, means for conducting fuel from said reservoir to said conduit and thence through said float-chamber to said device, and thermo-syphon means for heating the fuel in said conduit and thereby continuously circulating the heated fuel around said float-chamber.

5. Apparatus for supplying heated fuel to a device comprising a fuel reservoir, a float-chamber, a jacket for said chamber, a circuitous conduit including the space between said chamber and said jacket, means for conducting fuel from said reservoir to said conduit and thence through said float-chamber to said device, thermal means responsive to the temperature of said fuel for controlling its flow to said device, and means for heating the fuel in said conduit and thereby continuously circulating the heated fuel through said circuitous conduit independently of fuel flow to said device.

Signed by me at Boston, Massachusetts, this 24th day of November, 1928.

LUMAN T. THURBER.